United States Patent
Onishi et al.

(10) Patent No.: US 12,020,517 B2
(45) Date of Patent: Jun. 25, 2024

(54) WIRELESS COMMUNICATION DEVICE, WORK VEHICLE, AND WORK VEHICLE WIRELESS COMMUNICATION SYSTEM

(71) Applicant: TADANO LTD., Kagawa (JP)

(72) Inventors: Kazuhisa Onishi, Kagawa (JP); Daisuke Shinohara, Kagawa (JP)

(73) Assignee: TADANO LTD., Kagawa (JP)

( * ) Notice: Subject to any disclaimer, the term of this patent is extended or adjusted under 35 U.S.C. 154(b) by 452 days.

(21) Appl. No.: 16/962,731

(22) PCT Filed: Jan. 25, 2019

(86) PCT No.: PCT/JP2019/002509
§ 371 (c)(1),
(2) Date: Jul. 16, 2020

(87) PCT Pub. No.: WO2019/146760
PCT Pub. Date: Aug. 1, 2019

(65) Prior Publication Data
US 2020/0357202 A1    Nov. 12, 2020

(30) Foreign Application Priority Data

Jan. 26, 2018  (JP) ................. 2018-011077

(51) Int. Cl.
| | | |
|---|---|---|
| G07C 5/08 | (2006.01) | |
| G07C 5/00 | (2006.01) | |
| H04W 4/48 | (2018.01) | |

(52) U.S. Cl.
CPC .......... *G07C 5/0816* (2013.01); *G07C 5/008* (2013.01); *G07C 5/0808* (2013.01); *H04W 4/48* (2018.02)

(58) Field of Classification Search
CPC .... G07C 5/0816; G07C 5/008; G07C 5/0808; G07C 5/085; G07C 2205/02; H04W 4/48;
(Continued)

(56) References Cited

U.S. PATENT DOCUMENTS

| 9,607,449 B1 * | 3/2017 | Chen ................. G07C 5/008 |
| 2016/0055688 A1 * | 2/2016 | Miura ................. G07C 3/08 340/870.11 |

(Continued)

FOREIGN PATENT DOCUMENTS

| JP | H07-277675 A | 10/1995 |
| JP | 2008-210103 A | 9/2008 |

(Continued)

OTHER PUBLICATIONS

Sep. 21, 2021, European Search Report issued for related EP Application No. 19743220.6.

(Continued)

*Primary Examiner* — Adam D Tissot
(74) *Attorney, Agent, or Firm* — Paratus Law Group, PLLC

(57) ABSTRACT

This wireless communication device is equipped with: an acquisition unit for acquiring, from an onboard network of a work vehicle, an in-vehicle signal that travels through the onboard network; and a control unit for controlling wireless communication between the work vehicle and a portable terminal, and transmitting the acquired in-vehicle signal to the portable terminal. As a result, it is possible to provide a wireless communication device with which a worker can verify the status of the work vehicle from outside the work vehicle.

10 Claims, 1 Drawing Sheet

(58) Field of Classification Search
CPC .. H04Q 2209/40; H04Q 2209/86; H04Q 9/00; B60R 16/0231
See application file for complete search history.

(56) References Cited

U.S. PATENT DOCUMENTS

| | | | | |
|---|---|---|---|---|
| 2016/0309530 | A1* | 10/2016 | Miura | ............... H04W 76/11 |
| 2019/0025787 | A1* | 1/2019 | Yakushi | ............... G07C 5/008 |
| 2019/0031476 | A1 | 1/2019 | Onishi et al. | |
| 2020/0024825 | A1 | 1/2020 | Futakami | |
| 2020/0283273 | A1* | 9/2020 | Tokutome | ............... B66C 13/54 |

FOREIGN PATENT DOCUMENTS

| | | | |
|---|---|---|---|
| JP | 2009-040602 A | 2/2009 | |
| JP | 2013-023982 A | 2/2013 | |
| JP | 2013-233904 A | 11/2013 | |
| JP | 2014-113860 A | 6/2014 | |
| JP | 2014-151689 A | 8/2014 | |
| JP | 2015-098743 A | 5/2015 | |
| JP | 2017-216744 A | 12/2017 | |
| WO | WO 2017/150454 A1 | 9/2017 | |
| WO | WO 2017/183404 A1 | 10/2017 | |
| WO | WO-2017216985 A1 * | 12/2017 | ............. B66C 13/16 |

OTHER PUBLICATIONS

Mar. 5, 2019, International Search Report issued for related PCT Application No. PCT/JP2019/002509.

Mar. 5, 2019, International Search Opinion issued for related PCT Application No. PCT/JP2019/002509.

Jul. 12, 2023, European Communication issued for related EP Application No. 19743220.6.

* cited by examiner

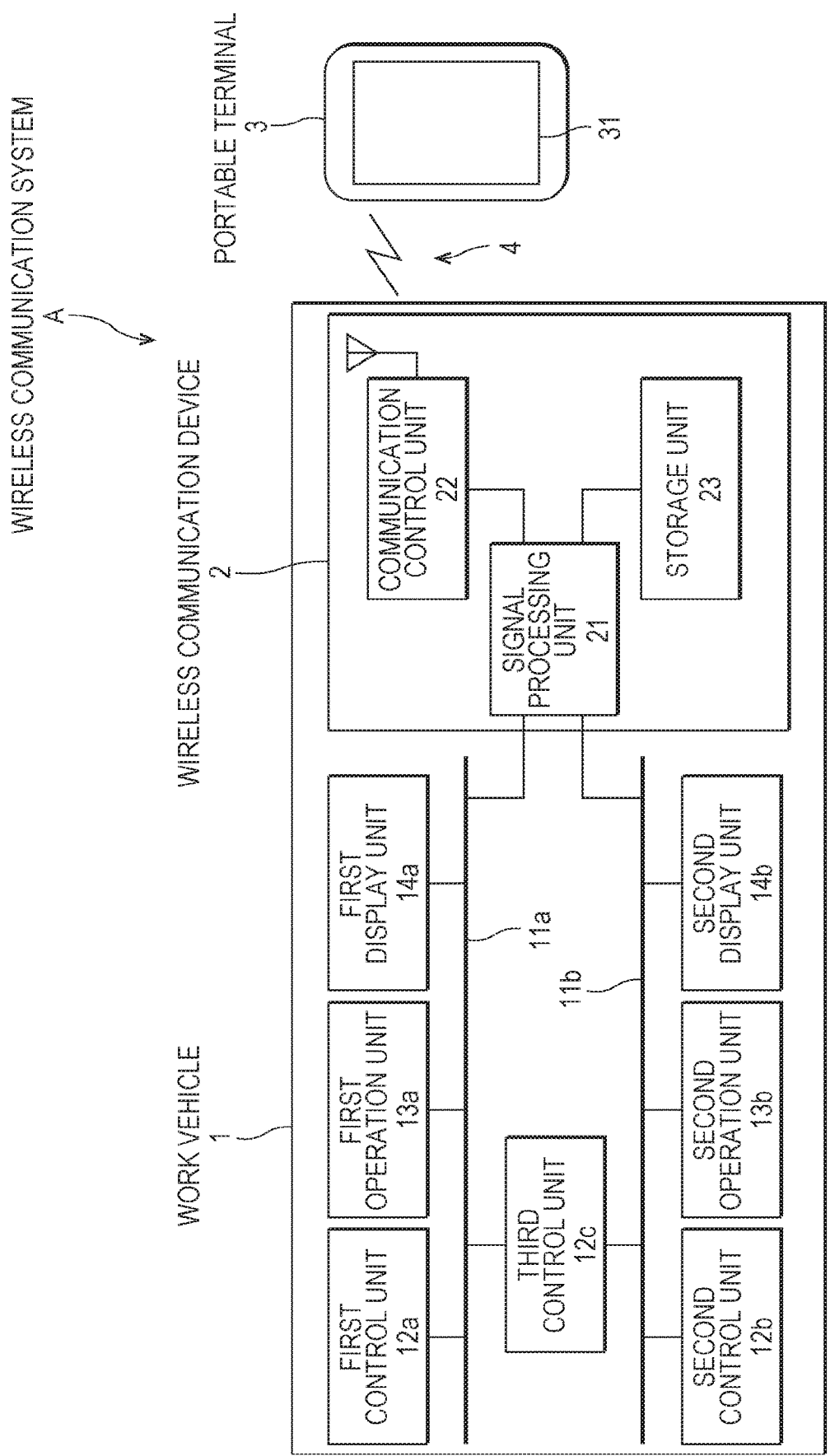

WIRELESS COMMUNICATION DEVICE, WORK VEHICLE, AND WORK VEHICLE WIRELESS COMMUNICATION SYSTEM

CROSS REFERENCE TO PRIOR APPLICATION

This application is a National Stage Patent Application of PCT International Patent Application No. PCT/JP2019/002509 (filed on Jan. 25, 2019) under 35 U.S.C. § 371, which claims priority to Japanese Patent Application No. 2018-011077 (filed on Jan. 26, 2018), which are all hereby incorporated by reference in their entirety.

TECHNICAL FIELD

The present invention relates to a wireless communication device, a work vehicle, and a work vehicle wireless communication system.

BACKGROUND ART

Patent Literature 1 discloses a mobile crane as a work vehicle. In performance of maintenance for such a work vehicle, a maintenance worker may verify a status of the work vehicle while working outside the work vehicle. However, for a conventional work vehicle, display units such as meters are provided only in the cab. For such a conventional work vehicle, one worker cannot verify a status of the work vehicle by looking at the display units while working outside the work vehicle. Therefore, one worker moves in and out of the cab to repeat the work and the verification, or two workers share the work outside the work vehicle and the verification in the cab. As a result, the maintenance work is inefficient.

CITATION LIST

Patent Literature

Patent Literature 1: JP 2009-40602 A

SUMMARY OF THE INVENTION

Problems to be Solved by the Invention

An object of the present invention is to provide a wireless communication device, a work vehicle, and a wireless communication system that allow a worker to verify a status of the work vehicle outside the work vehicle.

Solutions to Problems

One aspect of a wireless communication device according to the present invention includes: an acquisition unit configured to acquire, from an onboard network of a work vehicle, an in-vehicle signal that travels through the onboard network; and a control unit configured to control wireless communication between the work vehicle and a portable terminal, to transmit the acquired in-vehicle signal to the portable terminal.

Further, one aspect of a work vehicle according to the present invention includes: a work vehicle main body having an onboard network; and the above-described wireless communication device.

Further, one aspect of a work vehicle wireless communication system according to the present invention includes: the work vehicle; and a portable terminal that is wirelessly connected to the work vehicle via the wireless communication device.

Effects of the Invention

According to the present invention, a worker can verify a status of a work vehicle outside the work vehicle by using a portable terminal.

BRIEF DESCRIPTION OF DRAWINGS

FIG. 1 is a block diagram of a wireless communication system according to an embodiment of the present invention.

DESCRIPTION OF EMBODIMENTS

Next, an embodiment of the present invention will be described with reference to the drawing.

As illustrated in FIG. 1, a wireless communication system A according to the embodiment of the present invention performs wireless communication between a work vehicle 1 and a portable terminal 3. Examples of the work vehicle 1 include construction machines such as a mobile crane, an aerial work vehicle, a road-rail vehicle, and a hydraulic excavator.

(Work Vehicle)

First, the configuration of the work vehicle 1 will be described.

The work vehicle 1 has at least one onboard network. The work vehicle 1 of the present embodiment has two onboard networks, that is, a first onboard network 11a and a second onboard network 11b. Note that the number of onboard networks that the work vehicle 1 has is not particularly limited, and may be one or at least two. Note that parts of the work vehicle 1 excluding constituent elements of a wireless communication device 2 described later may be regarded as an exemplary work vehicle main body.

Various onboard devices equipped with the work vehicle 1 are in connection with each of the first onboard network 11a and the second onboard network 11b. The first onboard network 11a and the second onboard network 11b each include, for example, a communication line that interconnects the plurality of onboard devices. The respective communication protocols of the first onboard network 11a and the second onboard network 11b are not particularly limited, and examples of the communication protocols include a controller area network (CAN), a local interconnect network (LIN), and a FlexRay.

Examples of the onboard devices in connection with the first onboard network 11a and the second onboard network 11b include control units 12a to 12c, operation units 13a and 13b, and display units 14a and 14b. The examples of the onboard devices further include various sensors.

Each of the control units 12a to 12c is an onboard computer including a central processing unit (CPU), a memory, and the like. The control units 12a to 12c each have a function of controlling, for example, devices equipped with the work vehicle 1. The number of control units that are equipped with the work vehicle 1 is not particularly limited, and may be one or at least two. Further, the number of control units that are connected to one onboard network is not particularly limited.

Each of the operation units 13a and 13b is a switch, a lever, a pedal, or the like to be used to operate, for example, the devices equipped with the work vehicle 1. The operation units 13a and 13b are each provided, for example, in a cab or the like of the work vehicle 1. The number of operation units that are equipped with the work vehicle 1 is not particularly limited, and may be one or at least two. Further, the number of operation units that are connected to one onboard network is not particularly limited.

Each of the display units 14a and 14b includes a liquid crystal display or the like. The display units 14a and 14b are each provided in the cab of the work vehicle 1 or the like. The number of display units that are equipped with the work vehicle 1 is not particularly limited and may be one or at least two. Further, the number of display units that are connected to the one onboard network is not particularly limited.

The operation unit 13a is in connection with the control units 12a to 12c via the onboard network 11a, and the operation unit 13b is in connection with the control units 12a to 12c via the onboard network 11b. When a worker operates the operation units 13a and 13b, specific operation signals are output from the operation units 13a and 13b to the onboard networks 11a and 11b. The operation signals are input to the control units 12a to 12c via the onboard networks 11a and 11b. The control units 12a to 12c control, for example, the devices equipped with the work vehicle 1 on the basis of the operation signals. As a result, the worker can operate the work vehicle 1 by using the operation units 13a and 13b.

The display unit 14a is in connection with the control units 12a to 12c via the onboard network 11a, and the display unit 14b is in connection with the control units 12a to 12c via the onboard network 11b. The control units 12a to 12c each output an information signal indicating various types of information regarding the work vehicle 1, to the onboard networks 11a and 11b. The information signals are input to the display units 14a and 14b via the onboard networks 11a and 11b. The display units 14a and 14b each display the various types of information regarding the work vehicle 1 on the basis of the information signals. As a result, the worker can grasp the status of the work vehicle 1 through the display units 14a and 14b.

In such a manner, each of a plurality of onboard devices in connection with the onboard networks 11a and 11b transmits or receives a mutual signal, resulting in performance of various controls and processes. Hereinafter, signals to be transmitted and received via the onboard networks 11a and 11b are each referred to as an "in-vehicle signal". The in-vehicle signal may include the operation signal and the information signal as above, and another different signal. The in-vehicle signal may be regarded as a signal that travels between the control units 12a to 12c and the operation units 13a and 13b or between the control units 12a to 12c and the display units 14a and 14b.

In a case where the work vehicle 1 is a mobile crane, the onboard networks 11a and 11b each have a configuration as below, for example.

Generally, the onboard networks 11a and 11b are provided for individual control systems. The first onboard network 11a is provided for a control system of a crane device. Further, the second onboard network 11b is provided for a vehicle control system.

The first control unit 12a, the first operation unit 13a, and the first display unit 14a are in connection with the first onboard network 11a of the crane control system. The first control unit 12a has a function of controlling the crane device. The first operation unit 13a is a lever or the like to be used for operating the crane device. The first display unit 14a displays an operation status of the crane device.

The second control unit 12b, the second operation unit 13b, and the second display unit 14b are in connection with the second onboard network 11b of the vehicle control system. The second control unit 12b controls an engine for driving the vehicle. The second operation unit 13b is an accelerator pedal, a brake pedal, a vehicle system switch, or the like. The vehicle system switch may include a suspension-level setting switch, a drive changeover switch, a steering-mode changeover switch, and the like. The second display unit 14b is a combination meter or the like.

The work vehicle 1 may have the third control unit 12c that is connected to both the first onboard network 11a and the second onboard network 11b. The third control unit 12c functions, for example, as an overload prevention device. Information output from the overload prevention device may be displayed on, for example, the first display unit 14a.

(Wireless Communication Device)

Next, the configuration of the wireless communication device 2 provided on the work vehicle 1 will be described.

The wireless communication device 2 is in connection with the first onboard network 11a and the second onboard network 11b of the work vehicle 1. In a case where the work vehicle 1 has a plurality of onboard networks, the wireless communication device 2 may be connected to the plurality of onboard networks. Note that there is no need to connect the wireless communication device 2 to all the onboard networks of the work vehicle 1. The wireless communication device 2 may be connected to some onboard networks among the plurality of onboard networks that the work vehicle 1 has (in the present embodiment, either of the first onboard network 11a or the second onboard network 11b).

The wireless communication device 2 is physically attachable to and detachable from the first onboard network 11a and the second onboard network 11b, and may be connected to the first onboard network 11a and the second onboard network 11b only when needed. For example, the wireless communication device 2 may have a connector. As the wireless communication device 2, a wireless unit may be provided such that attachment or detachment between the connector on the wireless communication device 2 and the connector on the first onboard network 11a and the second onboard network 11b enables attachment or detachment of the wireless communication device 2. Note that the wireless communication device 2 may be non-detachable, and thus may be connected to the first onboard network 11a and the second onboard network 11b on a constant basis. That is, the wireless communication device 2 may be incorporated in the work vehicle 1.

The wireless communication device 2 has a signal processing unit 21, a communication control unit 22, and a storage unit 23. Each of the signal processing unit 21, the communication control unit 22, and the storage unit 23 may include hardware such as an electronic circuit, or part of the respective functions of the signal processing unit 21, the communication control unit 22, and the storage unit 23 may be achieved by software.

The signal processing unit 21 is in connection with the first onboard network 11a and the second onboard network 11b. The signal processing unit 21 acquires each in-vehicle signal from the first onboard network 11a and the second onboard network 11b. As an example, the signal processing unit 21 may acquire, in real time, an in-vehicle signal that travels through an onboard network (in the present embodiment, at least one of the first onboard network 11a and the second onboard network 11b). The signal processing unit 21 outputs the acquired in-vehicle signal as it is or performs a predetermined process on the acquired in-vehicle signal to output the processed in-vehicle signal, to the communication control unit 22 and the storage unit 23. The signal processing unit 21 corresponds to an exemplary acquisition unit.

The communication control unit 22 controls wireless communication with the portable terminal 3. The communication control unit 22 has a function as an access point in a wireless local area network (LAN). A network name (service set identifier: SSID), an encryption key (network key), and the like to be used for wireless communication are set in the communication control unit 22. The communication control unit 22 corresponds to an exemplary control unit.

Establishment of communication between the communication control unit 22 and the portable terminal 3 allows wireless connection between the wireless communication device 2 and the portable terminal 3. Hereinafter, such network established between the wireless communication device 2 and the portable terminal 3 is referred to as a wireless network 4. Note that examples of the connection scheme between the wireless communication device 2 and the portable terminal 3 include wireless communication such as WIFI (registered trademark) or Bluetooth (registered trademark). Further, in the present embodiment, the wireless communication device 2 and the portable terminal 3 are wirelessly connected to each other without the Internet. However, the wireless communication device 2 and the portable terminal 3 may be connected to each other via the Internet.

The communication control unit 22 transmits a signal to and receives a signal from the portable terminal 3. For example, the communication control unit 22 transmits, to the portable terminal 3, each in-vehicle signal acquired by the signal processing unit 21 from the first onboard network 11a and the second onboard network 11b. At this time, the communication control unit 22 performs a conversion process and the like between the communication protocols of the first onboard network 11a and the second onboard network 11b and the communication protocol of the wireless network 4. An in-vehicle signal that the communication control unit 22 transmits may be regarded as invisible information that travels through an onboard network, rather than visible information externally acquired by a camera or the like. The wireless communication system according to the present embodiment visualizes such invisible information that travels through the onboard network by displaying the visualized information, on a display of a portable terminal.

The storage unit 23 stores each in-vehicle signal acquired by the signal processing unit 21 from the first onboard network 11a and the second onboard network 11b. The history of the in-vehicle signal is accumulated in the storage unit 23.

Note that the functions of the signal processing unit 21, the communication control unit 22, and the storage unit 23 may be achieved by constituent elements included in the work vehicle 1.

(Portable Terminal)

Next, the configuration of the portable terminal 3 will be described.

The portable terminal 3 is a general-purpose computer including a CPU, a memory, and the like. The portable terminal 3 has a wireless communication function. The portable terminal 3 may be, for example, a personal computer, a tablet terminal, or a high-performance portable phone (smartphone). The portable terminal 3 can be disposed outside the cab of the work vehicle 1.

The portable terminal 3 has a display 31. The display 31 is, for example, a liquid crystal display. A display application for displaying information regarding the work vehicle 1 on the basis of a received in-vehicle signal is installed in the portable terminal 3. Information regarding the work vehicle 1 is displayed on the display 31.

Note that the portable terminal 3 may receive in-vehicle signals that are sequentially transmitted in real time from the wireless communication device 2. The portable terminal 3 may transmit a request signal to the wireless communication device 2, in a case where the portable terminal 3 needs to receive an in-vehicle signal. The request signal may include information regarding the type of the in-vehicle signal that the portable terminal 3 needs to receive. The wireless communication device 2 that has received such a request signal may transmit, to the portable terminal 3, the in-vehicle signal corresponding to the information included in the request signal. The wireless communication device 2 may stop transmission of an in-vehicle signal in a case where the wireless communication device 2 receives information including a stop instruction from the portable terminal 3.

(Operation of Wireless Communication System)

Next, the operation of the wireless communication system A will be described.

The wireless communication system A operates to transmit, to the portable terminal 3, each in-vehicle signal that travels through the first onboard network 11a and the second onboard network 11b of the work vehicle 1 and cause the portable terminal 3 to display information regarding the work vehicle 1. The details will be described below.

First, communication is established between the communication control unit 22 and the portable terminal 3. The network name, the encryption key, and the like that are set in the communication control unit 22 are used to establish the communication. The established communication enables transmission and reception of signals between the wireless communication device 2 and the portable terminal 3.

Various in-vehicle signals travel through the first onboard network 11a and the second onboard network 11b. The in-vehicle signals include operation signals output from the operation units 13a and 13b, information signals output from the control units 12a to 12c, and other signals. The signal processing unit 21 acquires the in-vehicle signals from the first onboard network 11a and the second onboard network 11b.

Here, the signal processing unit 21 may acquire all the in-vehicle signals that travel through the first onboard network 11a and the second onboard network 11b, or may select and acquire only necessary in-vehicle signal. For example, the signal processing unit 21 acquires only the information signals from the in-vehicle signals. Note that as an example, each information signal may include, for example, input and output information of the corresponding control unit (information regarding a digital signal, an analog signal, and a pulse signal). Further, as an example, each information signal may include information regarding a crane status calculated by the corresponding control unit (boom angle, boom length, and swing angle), and information regarding a vehicle status (engine speed, vehicle speed, and transmission mode).

Next, the signal processing unit 21 outputs the acquired in-vehicle signals to the communication control unit 22. The communication control unit 22 transmits the input in-vehicle signals to the portable terminal 3 via the wireless network 4. As described above, the wireless communication device 2 acquires the in-vehicle signals from the first onboard network 11a and the second onboard network 11b and transmits the acquired in-vehicle signals to the portable terminal 3.

The portable terminal 3 displays the information regarding the work vehicle 1 on the display 31 on the basis of each received in-vehicle signal. Specifically, the portable terminal 3 causes the display application to operate. The display application performs a process on each received in-vehicle signal to do imaging and the like, and then causes the display 31 to display the image. The same information as the information displayed on the display of the work vehicle 1 may be displayed on the display of the portable terminal 3 in real time. In this case, the in-vehicle signal received by the portable terminal 3 may be regarded as display information that is transmitted from the corresponding control unit to the display, in the onboard network of the work vehicle 1. Information may be displayed on the display of the portable terminal 3 in the same manner as the display manner of the display of the work vehicle 1. Note that the information to be displayed on the display of the portable terminal 3 may be part or all pieces of the information displayed on the display of the work vehicle 1.

For example, in a case where an in-vehicle signal output from the third control unit 12c that is the constituent of the overload prevention device is transmitted to the portable terminal 3, information regarding overload prevention can be displayed on the portable terminal 3. For example, the information regarding the overload prevention device includes information regarding a posture of the work vehicle such as the length and the vertical angle of the boom included in the crane device, and information regarding work such as the working radius. Note that the information regarding the posture may include a swing angle, an attachment mode, and the like. Further, the information regarding the work may include a load factor, load information, and the like.

As described above, the portable terminal 3 displays the information regarding the work vehicle 1 on the basis of each in-vehicle signal, and thus the worker can verify a status of the work vehicle 1 outside the work vehicle 1 by using the portable terminal 3. That is, the portable terminal 3 can be used as a substitute for the display units 14a and 14b. For example, in maintenance of the work vehicle 1, one worker can verify the status of the work vehicle 1 by looking at the portable terminal 3 while working outside the work vehicle 1. Therefore, the worker can efficiently perform the maintenance work.

Note that the worker may operate the portable terminal 3 to transmit a request including an instruction on transmitting maintenance information, from the portable terminal 3 to the wireless communication device 2. The wireless communication device 2 that has received this request may acquire an in-vehicle signal related to the maintenance information from the work vehicle 1, and thus may transmit the acquired in-vehicle signal to the portable terminal 3. The maintenance information may be information stored in the storage unit 23. As an example, the maintenance information may include at least one of respective pieces of input and output information of the control units 12a to 12c of the work vehicle 1 (analog signal, digital signal, or pulse signal), status information regarding the status of the work vehicle 1 (crane status and vehicle status), and the like.

Further, the worker may operate the portable terminal 3 to request the wireless communication device 2 for history information regarding an error occurred in the past in the work vehicle 1. The wireless communication device 2 that has received this request may acquire an in-vehicle signal related to the history information regarding the error from the work vehicle 1, and thus may transmit the acquired in-vehicle signal to the portable terminal 3. The history information regarding the error may be information stored in the storage unit 23.

Meanwhile, the signal processing unit 21 is in connection with the plurality of onboard networks (in the present embodiment, first onboard network 11a and second onboard network 11b). In addition, the signal processing unit 21 acquires an in-vehicle signal from each of the plurality of onboard networks (first onboard network 11a and second onboard network 11b). The communication control unit 22 transmits each in-vehicle signal acquired by the signal processing unit 21 to the portable terminal 3. That is, the wireless communication device 2 transmits the respective in-vehicle signals acquired from the plurality of onboard networks (first onboard network 11a and second onboard network 11b) to the portable terminal 3.

Therefore, in the case where the work vehicle 1 has the plurality of onboard networks (in the present embodiment, first onboard network 11a and second onboard network 11b), the portable terminal 3 displays information regarding the work vehicle 1 on the basis of the respective in-vehicle signals from the onboard networks. Therefore, the worker can verify various types of information regarding the work vehicle 1.

For example, an in-vehicle signal related to the crane device travels through the first onboard network 11a. Further, an in-vehicle signal related to the vehicle travels through the second onboard network 11b. The portable terminal 3 displays respective pieces of information on the basis of these in-vehicle signals. As a result, the worker can verify the information regarding the crane device and the information regarding the vehicle.

Note that it is preferable to add an identifier that identifies an onboard network to each in-vehicle signal acquired from the plurality of onboard networks (in the present embodiment, first onboard network 11a and second onboard network 11b). The signal processing unit 21 performs a process of adding the identifiers to the respective in-vehicle signals. The communication control unit 22 transmits data in which the identifiers are added to the respective in-vehicle signals, to the portable terminal 3. Addition of the respective identifiers to the in-vehicle signals enables identification between the first onboard network 11a and the second onboard network 11b on the portable terminal 3 side, so that the respective types of the in-vehicle signals can be identified.

The in-vehicle signals are stored in the storage unit 23 of the wireless communication device 2. The storage unit 23 may store all signals that travel through the onboard network of the work vehicle 1 (in the present embodiment, first onboard network 11a and second onboard network 11b). Further, the storage unit 23 may store only specific signals that travel through the onboard network of the work vehicle 1. In a case where an in-vehicle signal is acquired from the storage unit 23, analysis or the like can be performed with the in-vehicle signal. Specifically, the worker can use the in-vehicle signal stored in the storage unit 23 to perform a cause analysis and a situation analysis on a fault that occurs at a low frequency. Acquisition of the in-vehicle signal from the storage unit 23 may be performed via the communication control unit 22 or may be performed via a different interface provided in the wireless communication device 2.

Any signal may be transmitted from the portable terminal 3 to the work vehicle 1. The signal transmitted from the portable terminal 3 is received by the communication control unit 22. The communication control unit 22 inputs the received signal to the signal processing unit 21. The signal processing unit 21 outputs the input signal to the onboard network (in the present embodiment, first onboard network 11a and second onboard network 11b).

An example of the signal that the portable terminal 3 transmits is an operation signal for operating an operation target. When a worker operates the portable terminal 3, the operation signal is transmitted from the portable terminal 3. The wireless communication device 2 outputs the operation signal to the onboard network corresponding to the operation target between the first onboard network 11a and the second onboard network 11b. The onboard device (operation target) in connection with the first onboard network 11a and the second onboard network 11b performs a process on the basis of the operation signal. As a result, the work vehicle 1 can be remotely controlled by using the portable terminal 3.

REFERENCE SIGNS LIST

A wireless communication system
1 work vehicle
11a, 11b onboard network
12a to 12c control unit
13a, 13b operation unit
14a, 14b display unit
2 wireless communication device
21 signal processing unit
22 communication control unit
23 storage unit
3 portable terminal
31 display
4 wireless network

The invention claimed is:

1. A work vehicle, comprising:
a work vehicle main body supporting a boom; and
a wireless communication device, wherein
the work vehicle main body includes:
an onboard network including a first onboard network through which information regarding a boom status travels and a second onboard network through which information regarding a vehicle status travels;
a first control unit that is in connection with only the first onboard network of the first onboard network and the second onboard network and controls a crane device on which the boom is mounted;
a first operation unit that is in connection with only the first onboard network of the first onboard network and the second onboard network and is an operation unit for operating the crane device;
a first display unit that is in connection with only the first onboard network of the first onboard network and the second onboard network and displays an operation status of the crane device;
a second control unit that is in connection with only the second onboard network of the first onboard network and the second onboard network and controls a vehicle included in the work vehicle main body;
a second operation unit that is in connection with only the second onboard network of the first onboard network and the second onboard network and is an operation unit for operating the vehicle;
a second display unit that is in connection with only the second onboard network of the first onboard network and the second onboard network and displays a status of the vehicle; and
a third control unit which is a constituent of an overload prevention device, is in connection with the first onboard network and the second onboard network, and is configured to output information regarding the overload prevention device to the onboard network, wherein the first onboard network and the second onboard network are provided for individual control systems in the work vehicle main body and are networks configured by different communication lines,
the wireless communication device includes a computer,
the computer includes:
an acquisition unit configured to acquire, from the first onboard network and the second onboard network, an in-vehicle signal that includes the information regarding the boom status, the information regarding the vehicle status, and the information regarding the overload prevention device; and
a communication control unit configured to control wireless communication between the work vehicle and a portable terminal, to transmit the information regarding a boom status, the information regarding a vehicle status, and the information regarding the overload prevention device that are acquired by the acquisition unit to the portable terminal.

2. The work vehicle according to claim 1,
wherein the communication control unit transmits, to the portable terminal, data in which identifiers for identifying the first onboard network and the second onboard network are added to the respective in-vehicle signals acquired from the first onboard network and the second onboard network.

3. The work vehicle according to claim 1, further comprising:
a storage unit configured to store the acquired in-vehicle signal.

4. The work vehicle according to claim 3,
wherein the acquisition unit acquires all the in-vehicle signal that travels through the onboard network, and
the storage unit stores information from all in-vehicle signals acquired by the acquisition unit.

5. The work vehicle according to claim 1,
wherein the acquisition unit sequentially acquires, in real time, the in-vehicle signal that travels through the onboard network.

6. The work vehicle according to claim 1,
wherein the communication control unit transmits, to the portable terminal, the in-vehicle signal corresponding to a request received from the portable terminal.

7. The work vehicle according to claim 1,
wherein the acquisition unit acquires an in-vehicle signal related to information to be displayed on a display of the work vehicle, from the in-vehicle signal that travels through the onboard network.

8. The work vehicle according to claim 1,
wherein the communication control unit transmits, to the portable terminal, an in-vehicle signal related to information to be used in maintenance of the work vehicle.

9. The work vehicle according to claim 8,
wherein the information to be used in maintenance includes at least one of input and output information of a control unit of the work vehicle and information regarding a status of the work vehicle.

10. A work vehicle wireless communication system, comprising:
a work vehicle; and
a portable terminal, wherein
the work vehicle includes a work vehicle main body supporting a boom, and a wireless communication device,
the work vehicle main body includes:
an onboard network including a first onboard network through which information regarding a boom status travels and a second onboard network through which information regarding a vehicle status travels;
a first control unit that is in connection with only the first onboard network of the first onboard network and the second onboard network and controls a crane device on which the boom is mounted;
a first operation unit that is in connection with only the first onboard network of the first onboard network and the second onboard network and is an operation unit for operating the crane device;
a first display unit that is in connection with only the first onboard network of the first onboard network and the second onboard network and displays an operation status of the crane device;
a second control unit that is in connection with only the second onboard network of the first onboard network and the second onboard network and controls a vehicle included in the work vehicle main body;
a second operation unit that is in connection with only the second onboard network of the first onboard network and the second onboard network and is an operation unit for operating the vehicle;
a second display unit that is in connection with only the second onboard network of the first onboard network and the second onboard network and displays a status of the vehicle; and
a third control unit which is a constituent of an overload prevention device, is in connection with the first onboard network and the second onboard network, and is configured to output information regarding the overload prevention device to the onboard network,
the first onboard network and the second onboard network are provided for individual control systems in the work vehicle main body and are networks configured by different communication lines,
the wireless communication device includes a computer, the computer includes:
an acquisition unit configured to acquire, from the first onboard network and the second onboard network, an in-vehicle signal that includes the information regarding the boom status, the information regarding the vehicle status, and the information regarding the overload prevention device; and
a communication control unit configured to control wireless communication between the work vehicle and a portable terminal, to transmit the acquired information regarding a boom status, the information regarding a vehicle status, and the information regarding the overload prevention device that are acquired by the acquisition unit to the portable terminal, and
the portable terminal is configured to be wirelessly connected to the work vehicle via the wireless communication device.

* * * * *